Patented July 23, 1929.

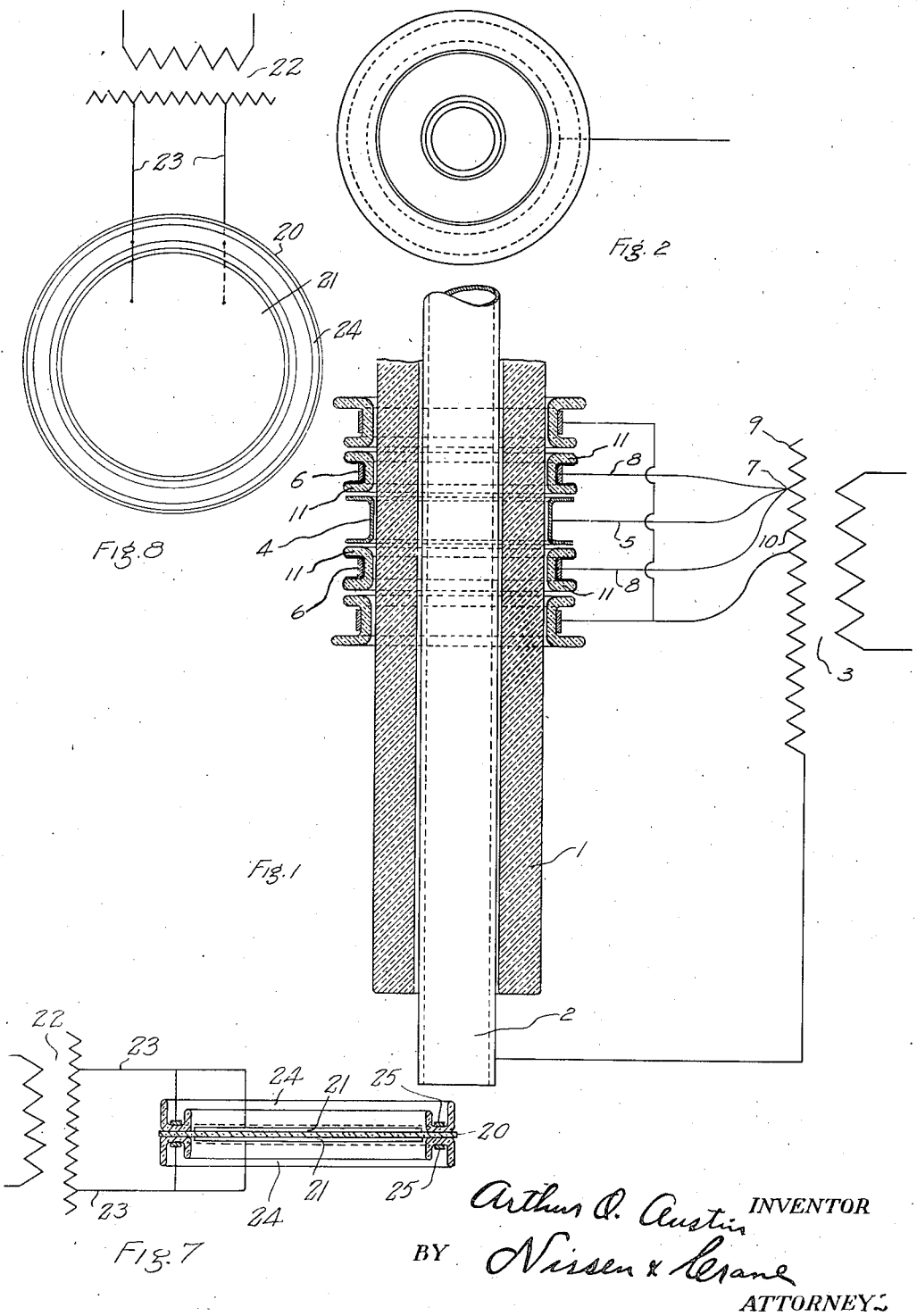

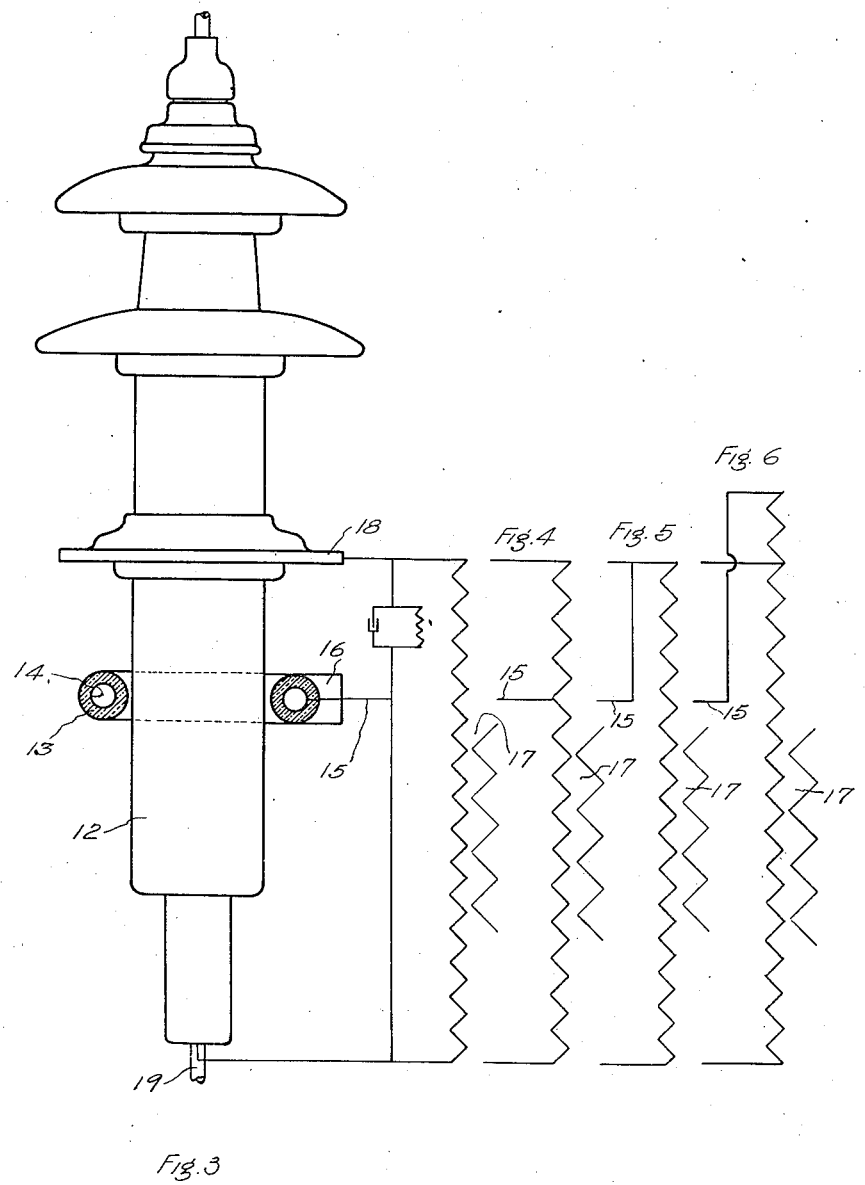

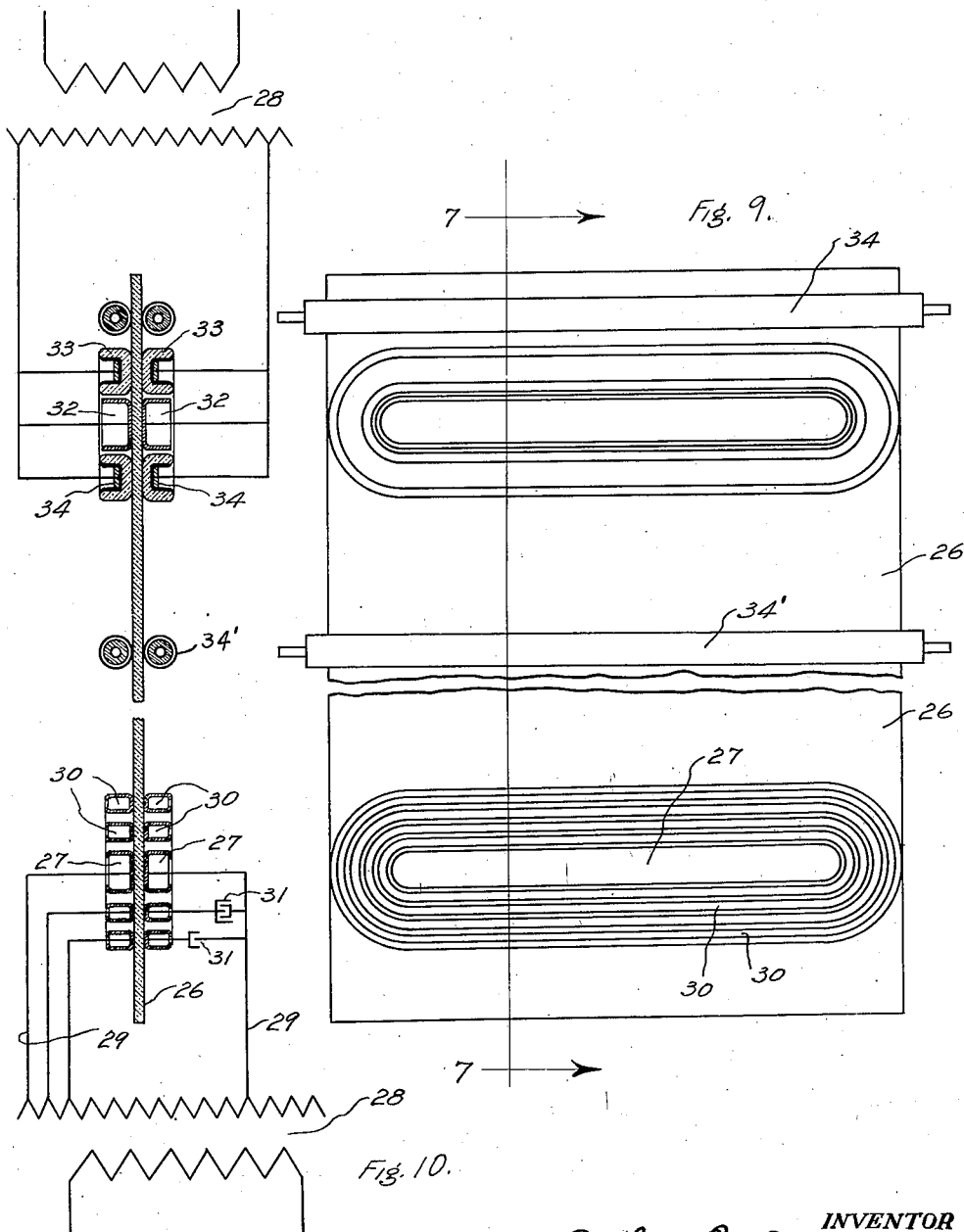

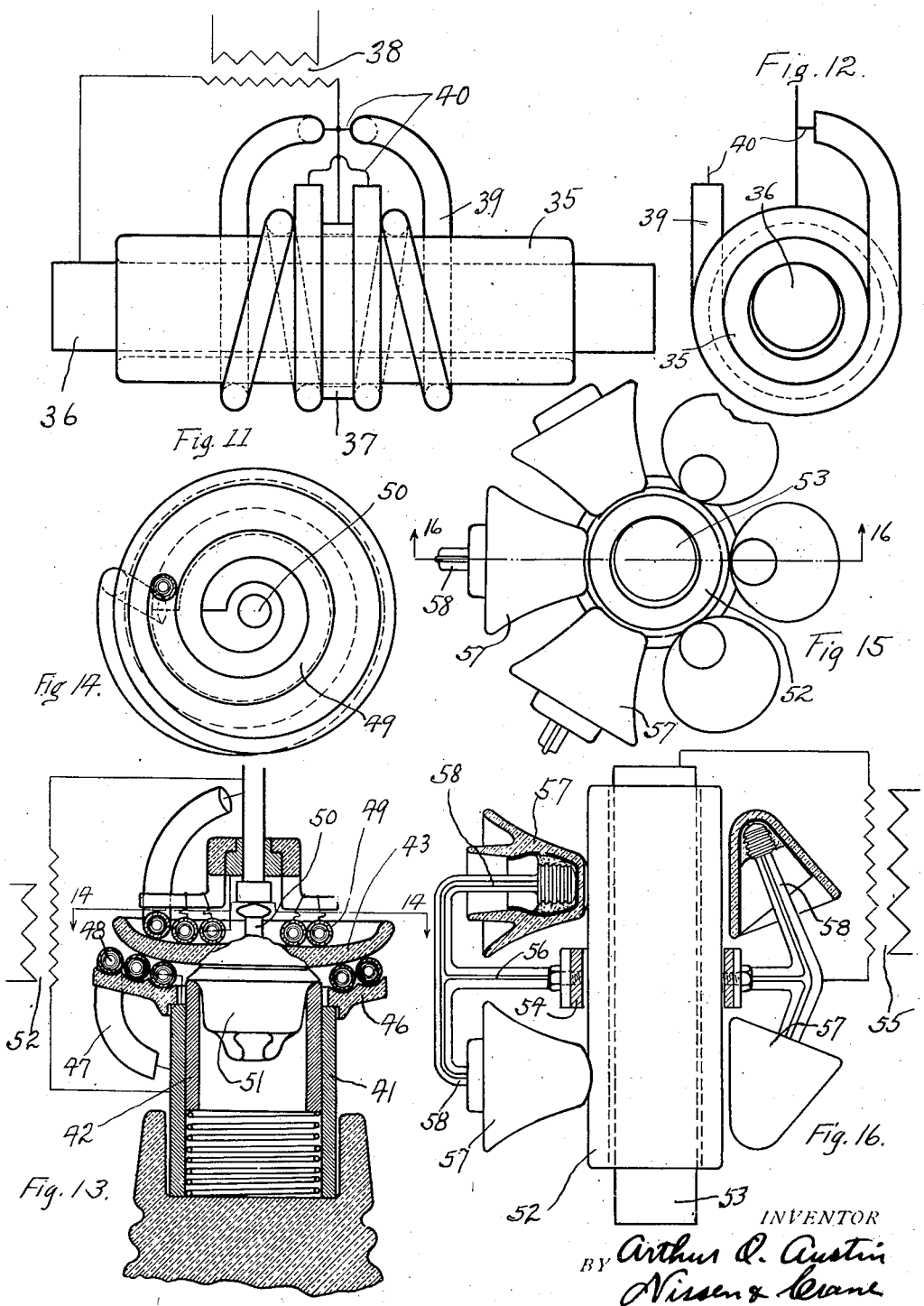

1,721,847

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

APPARATUS FOR TESTING THE DIELECTRIC STRENGTH OF INSULATING MATERIAL.

Application filed March 1, 1923. Serial No. 621,968.

This invention relates to test apparatus for dielectric material such as plates, sheets, insulator parts and other dielectrics, and has for its object the provision of improved apparatus by means of which the test piece may be subjected to increased voltages without causing discharge between the electrodes by which the voltage is applied. Other objects will appear hereinafter.

The invention is exemplified in the combination and arrangement of the parts of the testing apparatus and the steps of the process described in the following specification and illustrated in the accompanying drawings.

In the drawings, Figure 1 is a longitudinal sectional view of a tube of insulating material showing one manner of testing the dielectric strength according to the present invention.

Figure 2 is an end view of the apparatus shown in Fig. 1.

Figure 3 is an elevation of a bushing insulator showing a somewhat modified arrangement of apparatus for testing.

Figures 4, 5 and 6 are circuit diagrams which may be used in connection with the arrangement of apparatus shown in Fig. 3.

Fig. 7 is a sectional view showing a test arrangement as applied to a dielectric plate.

Fig. 8 is a plan view of the apparatus shown in Fig. 7.

Fig. 9 is a plan view of an arrangement for testing insulator parts, showing two sets of apparatus applied thereto.

Fig. 10 is a section on line 7—7 of Fig. 9, showing also circuit diagrams for the testing apparatus.

Fig. 11 is a somewhat diagrammatic elevation showing a different arrangement of apparatus for testing a tube.

Fig. 12 is an end view of the arrangement shown in Fig. 11.

Fig. 13 is a vertical section showing a modified arrangement of apparatus for testing an insulator disk.

Fig. 14 is a top plan view of the test piece shown in Fig. 13 with the control electrodes in place.

Fig. 15 is an end elevation of a different arrangement of control electrodes.

Fig. 16 is a top plan view of the arrangement shown in Fig. 15 with parts in section.

In testing tubular insulators, plates or sheets which are relatively thin compared to the surface or leakage path the flash-over of the pieces is greatly lowered by the shunting effect of surface streamers when alternating current is used for testing. Where the shunting effect may be eliminated it is often possible to raise the flash-over or test values on the piece by a very considerable percentage.

By testing at a high potential it is possible to increase the severity of the proving test and insure a much higher efficiency of operation of the material when placed in service. This is a particular advantage when testing bushings, the lower ends of which operate in oil, such as bushings used in oil switches and transformers. Owing to the immersion of the lower end of the bushing in oil it is possible to make this end of the bushing quite short. It is, however, exceedingly difficult to place a test on the bushings without immersing the lower end in oil. Testing the bushings in oil always leaves some uncertainty as the oil may vary and the stress placed on the portion below the oil line is rather uncertain.

Where the test can be made in air, however, and a high voltage applied, the air will tend to break down and distribute the stress at practically a definite value so that tests may be repeated under practically the same conditions.

Figure 1 shows a section of a bushing insulator member under test conditions. The main dielectric member 1 is placed over an electrode 2. The electrode 2 being connected to a source of voltage such as the high voltage side of a transformer 3. Another electrode 4 is placed around the tubular member and connected to the other end of the transformer by a conductor 5. When the voltage is raised streamers begin to flow along the outer surface longitudinally from the member 4. These streamers if not restricted will shunt the surface and cause the piece to flash-over at a comparatively low value. The presence of the electrode on the inside induces the flash-over, as it is only necessary to break down the air on one surface in order to form a condenser by the field set up between the center electrode and the streamers. In order to prevent streamers from building out and producing a shunting effect, insulated controls 6 are placed on each side of the main electrode or collar 4. These insulated controls may be charged from the transformer by connecting at 7 by means of leads 8 to give the same potential as the main electrode ring 4, or they may be tapped in at different points as at 9 or 10 to give different potentials. These controls furnish charging current so that the streamers from 4 along the tube will be restricted. This will reduce the shunting power and permit a higher stress being placed on the bushing without causing flash-over.

Under some conditions it may be advisable to energize the controls by attaching to a different point in the transformer as at 9 or at 10. If the insulation 11 of the control members is very thick adjacent to the piece under test the controls may be connected at 9 in order to have sufficient voltage to restrict the streamers from the ring 4. If, however, the insulation is thin the longitudinal streamers may be restricted by tapping at a point which will give a lower potential as at 10. A number of rings may be placed around the tubular member and tapped to different points in the transformer or to a series of condensers so as to distribute the stress and prevent longitudinal streamers of such magnitude that they will shunt the insulating surface. These insulated controls used to supply the charging current and set up stress in the member under test may be varied considerably, depending upon the results desired. They may be placed closely together or widely separated, depending upon conditions. In any event, it is necessary that they have sufficient insulation so that they will not flash-over. In some cases it is possible to grade the stress for the various controls by the use of resistances in series with the electrode surfaces.

Figure 3 shows another application used to raise the flash-over of the lower end of a bushing 12. An insulated control member 13 of tubular section has its inner surface plated or covered with a conductor coating 14. This coating is attached by a lead 15 running thru an insulating projection 16 to a transformer 17 at the desired point by one of the several different schemes illustrated in Figs. 3, 4, 5 and 6. There may be several of these insulated controls energized at the same potential or at different potentials by connecting at different points in the transformer or by the use of condensers, so as to grade the voltage. The use of a single control will raise the flash-over a very considerable amount and the use of several controls or a control which is designed to grade the stress will permit of very high test values before flash-over will occur. The test voltage is applied from the transformer 17 to the supporting collar 18 and internal conductor 19.

As the method is particularly applicable where the charging current is high it may be used to advantage in testing thin plates of insulation or in testing paper or insulating fabric such as varnished cambric.

Figs. 7 and 8 show a method of applying a high test voltage to a circular disk of insulating material 20. The electrodes 21 are connected to a suitable source of voltage supply such as transformer 22 by conductors 23, and surface streamers are prevented from flowing out over the edges of the disk and thus lowering the flash-over voltage by the annular control members 24 comprising circular channels of dielectric material in which are positioned electrodes 25 connected to the source of voltage supplied. This permits of a very high voltage being placed on a piece over practically its entire area, so that if it is desired to operate the disk in oil a high insulator value will be insured at practically the edge of the piece. There are various applications along this general line and the method is valuable in preventing the streamers which might otherwise carbonize the surface to some extent.

Figs. 9 and 10 illustrate an application of the method very similar to that shown in Figs. 7 and 8, except that the method is applicable to continuous testing of insulating fabric, paper or insulating sheets. The insulating material 26 is subjected to stress by the main electrodes 27 connected to the transformer 28 by leads 29. Shunting streamers are prevented by the controls 30 which are connected to the transformer either at the same potential as the electrodes 27 or at different points, so as to grade the stress. They may be connected to the same point as the main electrodes by the use of condensers 31, in order to charge the inner surfaces at a different potential from the main electrodes and effect the highest degree of flash-over.

In the upper portion of Figs. 9 and 10 there is shown another testing set having test electrodes 32 connected to the transformer 28. Control members 33 of dielectric material having conductors 34 arranged within their channel surround the electrodes 32. The material 26 may be continuously fed past the testing apparatus by suitable means such as rollers 34.

In the arrangement of test apparatus shown in Figs. 11 and 12, a tubular insulator member 35 has an internal electrode 36 and external electrode comprising a conductor ring 37, the electrodes being connected with a suitable source of alternating electro-motive force such as a transformer 38. Adjacent the electrode 37 a flexible insulated electrode 39 is wound about the insulator tube 35. This supplemental electrode may be in the form of a rubber tube or hose having a conductor such as a coil spring or other form of conductor extending therethru. The conductor member is connected by leads 40 to the main electrode 37.

In the form shown in Figs. 13 and 14, a supporting base 41 is provided having a spring seat 42 thereon for receiving a test piece 43 which may be one member of a suspension series of insulators as illustrated in the drawings. A suitable support 46 is carried by the base 41 and may be made of dielectric material as shown in the drawing. Upon this support is wound a flexible hose or other flexible insulation 47 having a conductor member 48 arranged therein. The conductor member may be a coil spring to permit easy disposal of the hose upon its support. A similar insulated conductor 49 is coiled upon the upper face of the test piece about the main electrode 50. Test voltage is applied to the main electrodes 50 and 51 from a transformer 52, or other suitable source, and the insulated conductors 47 and 49 are connected by lead wires to the corresponding main electrodes.

In the form shown in Figs. 15 and 16, an insulator tube 52 is provided with main electrodes 53 and 54 upon which test potential is impressed from a transformer 55. The electrode 54 is provided with spider arms 56 which are electrically connected with the main electrode 54 and which carry insulators 57 on the ends of control horns 58 which project to portions adjacent the surface of the test piece 52 at points removed from the main electrode 54.

In the form shown in Figs. 11 to 16 inclusive, the electrostatic field about the test piece is controlled by the supplemental conductors positioned adjacent the surface of the test piece at points spaced from the main electrodes. The action is similar to that described in connection with the previously discussed arrangement of apparatus.

I claim:

1. Apparatus for testing insulators comprising terminal members for impressing test voltages on an insulator at the sides thereof, a conductor spaced from one of said terminal members for supplying charging current to said insulator at a distance from the place of application of said test voltages and a dielectric covering for said conductor, said conductor being free from attachment to the insulators being tested to permit ready application of said testing apparatus to different insulators.

2. Apparatus for testing the dielectric strength of an insulator plate comprising terminal members disposed at opposite sides of a plate to be tested and at a distance from each other through said plate shorter than the minimum path of discharge between said members around the edge of said plate for impressing test voltages on said plate, a conductor connected with one of said terminal members and extending adjacent said insulator plate at a distance from the place of application of said test voltages to supply charging current to said insulator plate, and a dielectric covering for said conductor to oppose discharge therefrom.

3. Means for testing the resistance to perforation of a dielectric plate comprising electrodes disposed adjacent opposite points on the surface of said plate and separated from each other by a distance approximately equal to the thickness of said plate, a supplemental electrode disposed adjacent one of said first named electrodes, means for charging said first mentioned electrodes to test potential, and means for charging said supplemental electrode to substantially the same potential as one of said first mentioned electrodes, and a dielectric covering for said supplemental electrode.

4. Means for subjecting a dielectric member to a test potential greater than the normal flashover voltage for said member, said testing means comprising electrodes disposed at opposite sides of said dielectric member and separated from each other by a distance materially less than the air discharge distance between said electrodes, means for charging said electrodes to test potential, and a plurality of supplemental electrodes disposed adjacent the surface of said dielectric member at the same side thereof as one of said first mentioned electrodes but spaced therefrom, and a covering of dielectric material for said supplemental electrodes.

5. Means for subjecting a dielectric member to test potentials greater than the normal flashover voltage for said member, said means comprising test electrodes disposed adjacent opposite portions of said dielectric member and separated from each other by a distance materially less than the air discharge distance between said electrodes, means for impressing test voltage upon said electrodes, and a supplemental electrode disposed adjacent the surface of said dielectric member at the same side thereof as one of said test electrodes, said supplemental electrode comprising an elongated member free from attachment to said dielectric member and having a covering of dielectric material surrounding the same, and means for charging said supplemental electrode to substantially the same potential as the test electrode adjacent thereto.

6. Means for testing a tubular member of dielectric material comprising an electrode disposed within said tubular member, a second electrode adjacent the outer surface of said tubular member, an elongated conductor having a dielectric covering therefor wound about the outer surface of said tubular member, means for subjecting said first and second mentioned electrodes to test voltages, and means for impressing on said elongated conductor a voltage substantially equal to that of said second mentioned electrode.

7. Apparatus for testing insulation, comprising a main elcetrode for applying test voltage to said insulation, supplemental electrodes for controlling surface currents and flashover, said supplemental electrodes being spaced from one another adjacent the surface of insulation to be tested, and electrically connected to the main electrode or other suitable source of voltage, and dielectric coverings for said supplemental electrodes for preventing discharge from said supplemental electrodes.

In testimony whereof I have signed my name to this specification on this 24th day of February, A. D. 1923.

ARTHUR O. AUSTIN.